(12) United States Patent
Tokumaru et al.

(10) Patent No.: US 11,863,724 B2
(45) Date of Patent: Jan. 2, 2024

(54) INFORMATION PROCESSING APPARATUS AND WIRELESS COMMUNICATION METHOD

(71) Applicant: CANON KABUSHIKI KAISHA, Tokyo (JP)

(72) Inventors: Akiko Tokumaru, Tokyo (JP); Yasuo Komada, Kashiwa (JP); Keigo Ogura, Tokyo (JP); Kouichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/064,202

(22) Filed: Dec. 9, 2022

(65) Prior Publication Data

US 2023/0105860 A1    Apr. 6, 2023

Related U.S. Application Data

(63) Continuation of application No. 17/715,624, filed on Apr. 7, 2022, now Pat. No. 11,553,106, which is a (Continued)

(30) Foreign Application Priority Data

Feb. 28, 2006 (JP) .................................. 2006-053345
Feb. 9, 2007 (JP) .................................. 2007-030175

(51) Int. Cl.
*H04N 1/32* (2006.01)
*H04L 9/40* (2022.01)
(Continued)

(52) U.S. Cl.
CPC ......... *H04N 1/32512* (2013.01); *H04L 63/18* (2013.01); *H04N 1/00103* (2013.01);
(Continued)

(58) Field of Classification Search
CPC ........... H04N 1/32512; H04N 1/00315; H04N 1/00342; H04N 1/00925; H04N 1/4413;
(Continued)

(56) References Cited

U.S. PATENT DOCUMENTS

| 7,602,511 B2 * | 10/2009 | Kojima | H04N 1/32101 |
| | | | 358/440 |
| 7,793,109 B2 * | 9/2010 | Ortiz | H04L 63/0861 |
| | | | 713/186 |
| 2007/0071416 A1 * | 3/2007 | Ikemizu | H04N 21/8153 |
| | | | 386/259 |

* cited by examiner

*Primary Examiner* — Allen H Nguyen
(74) *Attorney, Agent, or Firm* — Canon U.S.A., Inc. I.P. Division

(57) ABSTRACT

An information processing apparatus includes a first communication unit configured to communicate with a first communication apparatus; a second communication unit configured to wirelessly communicate with each of one or more second wireless communication apparatuses; an acquisition unit configured to acquire from the first communication apparatus via the first communication unit an apparatus ID that is held by the first communication apparatus and that is used for identifying one of the one or more second wireless communication apparatuses to or from which the second communication unit transmits or receives data; and a control unit configured to control the second communication unit to transmit or receive the data to or from the one of the one or more second wireless communication apparatuses that is identified by the apparatus ID acquired by the acquisition unit.

15 Claims, 9 Drawing Sheets

Related U.S. Application Data continuation of application No. 16/928,920, filed on Jul. 14, 2020, now Pat. No. 11,336,796, which is a continuation of application No. 16/208,114, filed on Dec. 3, 2018, now Pat. No. 10,757,294, which is a continuation of application No. 15/451,975, filed on Mar. 7, 2017, now Pat. No. 10,178,270, which is a continuation of application No. 14/678,252, filed on Apr. 3, 2015, now Pat. No. 9,621,755, which is a continuation of application No. 11/679,321, filed on Feb. 27, 2007, now Pat. No. 9,026,103.

(51) Int. Cl.
*H04W 12/08* (2021.01)
*H04W 12/06* (2021.01)
*H04N 1/00* (2006.01)
*H04N 1/44* (2006.01)
*H04W 84/18* (2009.01)

(52) U.S. Cl.
CPC ..... *H04N 1/00315* (2013.01); *H04N 1/00342* (2013.01); *H04N 1/00925* (2013.01); *H04N 1/4413* (2013.01); *H04W 12/06* (2013.01); *H04W 12/068* (2021.01); *H04W 12/08* (2013.01); *H04N 2201/0039* (2013.01); *H04N 2201/0055* (2013.01); *H04N 2201/0094* (2013.01); *H04N 2201/3205* (2013.01); *H04W 84/18* (2013.01)

(58) Field of Classification Search
CPC ... H04N 1/00103; H04L 63/18; H04W 12/68; H04W 12/06; H04W 12/08
USPC ........................................................ 358/1.14
See application file for complete search history.

INFORMATION PROCESSING APPARATUS AND WIRELESS COMMUNICATION METHOD

CROSS-REFERENCE TO RELATED APPLICATIONS

This application is Continuation of U.S. patent application Ser. No. 17/715,624, filed on Apr. 7, 2022, which is a Continuation of U.S. patent application Ser. No. 16/928,920, filed on Jul. 14, 2020 and now U.S. Pat. No. 11,336,796, which is a Continuation of U.S. patent application Ser. No. 16/208,114, filed on Dec. 3, 2018 and now U.S. Pat. No. 10,757,294, which is a Continuation of U.S. patent application Ser. No. 15/451,975, filed on Mar. 7, 2017 and now U.S. Pat. No. 10,178,270 which is a Continuation of U.S. patent application Ser. No. 14/678,252, filed on Apr. 3, 2015 and now U.S. Pat. No. 9,621,755, which is a Continuation of U.S. patent application Ser. No. 11/679,321, filed on Feb. 27, 2007 and now U.S. Pat. No. 9,026,103, which claims the benefit of Japanese Application No. 2006-053345, filed on Feb. 28, 2006, and Japanese Application No. 2007-030175, filed on Feb. 9, 2007, each of which are hereby incorporated by reference herein in their entirety.

BACKGROUND OF THE INVENTION

Field of the Invention

The present invention relates to an information processing apparatus capable of wirelessly communicating with a first communication apparatus and with a plurality of second wireless communication apparatuses, and to a wireless communication method.

Description of the Related Art

In recent years, technologies for reducing the complexity associated with connecting cables when image data stored in portable information terminals, such as cellular phones, digital cameras, notebook computers, and personal digital assistants (PDAs), are printed with image processing apparatuses, such as printers, have been suggested. For example, a method for connecting to a printer via wireless communication, such as a wireless local-area network (LAN), for example, Bluetooth™ or IEEE 802.11a/b/g/n, has been suggested.

Thus, unlike a case of connection using a wired interface, such as a universal serial bus (USB) or an IEEE 1284 cable, users do not have any uncertainty regarding where to insert a cable into the back of an apparatus and do not have to be bothered about where the cable is to be connected. A technology described, for example, in Japanese Patent Laid-Open No. 2004-185388 is available.

For the connection using a wired interface, such as a USB or an IEEE 1284 cable, due to the cable connection, a user is able to clearly understand a portable information terminal and an image processing apparatus that are to be connected to each other. However, for a system using wireless communication, for example, for a system using Bluetooth, since wireless communication is normally available within a range of about 10 m, a plurality of communication apparatuses, such as image processing apparatuses, having an identical wireless communication function may be located within a range in which communication is available. In this case, it is difficult for a portable information terminal to automatically determine which communication apparatus among the plurality of communication apparatuses it is to connect to.

There is a similar problem in the case of an image processing apparatus. For example, when an image processing apparatus attempts to transfer data to a portable information terminal, a plurality of portable information terminals having an identical wireless communication function may be located within a range in which the image processing apparatus can perform communication (that is, a range in which radio waves can reach). In this case, it is difficult for the image processing apparatus to automatically determine which portable information terminal among the plurality of portable information terminals it is to connect to.

Thus, a method has been suggested in which, when a plurality of portable information terminals capable of wirelessly communicating with a communication apparatus exists, a list of the plurality of portable information terminals capable of wirelessly communicating with the communication apparatus is displayed on a display unit of the communication apparatus and a desired portable information terminal is selected from the list of the plurality of portable information terminals by a user operation. For example, a method described in Japanese Patent Laid-Open No. 2005-252564 is available.

Another method is also suggested in Japanese Patent Laid-Open No. 2005-252564. In this method, apparatus information of portable information terminals that have previously established communication with a communication apparatus is stored and displayed on a display unit of the communication apparatus, and a desired portable information terminal is selected in accordance with the apparatus information by a user operation.

In addition, a method for easily identifying a portable information terminal to communicate with a wireless communication apparatus is suggested, for example, in Japanese Patent Laid-Open No. 2005-94206. In this method, a reader receives image data displayed on a display unit of a portable information terminal. The image data is compared with a picture image acquired via a wireless communication unit. If the image data displayed on the display unit of the portable information terminal is exactly the same as the picture image acquired via the wireless communication unit, the portable information terminal is identified as a destination terminal to be wirelessly communicated by the wireless communication apparatus.

However, in a network using such wireless communication, when a plurality of portable information terminals exists within a range in which communication is available, a list of the plurality of portable information terminals capable of communication must be displayed on the display unit. Alternatively, for every communication operation, a list of portable information terminals that have previously established communication with the communication apparatus must be displayed on the display unit and a user has to select a desired portable information terminal from the list of portable information terminals.

SUMMARY OF THE INVENTION

The present invention provides a mechanism capable of easily identifying a portable information terminal that can transmit or receive data.

An information processing apparatus according to an aspect of the present invention includes a first communication unit configured to communicate with a first communication apparatus; a second communication unit configured to wirelessly communicate with each of one or more second wireless communication apparatuses; an acquisition unit configured to acquire via the first communication unit from the first communication apparatus an apparatus ID that is held by the first communication apparatus and that is used for identifying one of the one or more second wireless communication apparatuses to or from which the second communication unit transmits or receives data; and a control unit configured to control the second communication unit to transmit or receive the data to or from the one of the one or more second wireless communication apparatuses that is identified by the apparatus ID acquired by the acquisition unit.

An information processing apparatus according to another aspect of the present invention includes a first communication unit configured to communicate with a first communication apparatus; a second communication unit configured to wirelessly communicate with each of one or more second wireless communication apparatuses; an acquisition unit configured to acquire from the one or more second wireless communication apparatuses capable of communication via the second communication unit apparatus IDs that identify the corresponding one or more second wireless communication apparatuses in response to start of communication between the first communication unit and the first communication apparatus; a determination unit configured to determine one of the apparatus IDs acquired by the acquisition unit that corresponds to the one of the one or more second wireless communication apparatuses to or from which the second communication unit transmits or receives data; and a control unit configured to control the second communication unit to transmit or receive the data to or from the one of the one or more second wireless communication apparatuses that corresponds to the one of the apparatus IDs determined by the determination unit.

A wireless communication method according to an aspect of the present invention for use in an information processing apparatus including a first communication unit configured to communicate with a first communication apparatus and a second communication unit configured to wirelessly communicate with each of one or more second wireless communication apparatuses includes an acquisition step of acquiring from the first communication apparatus an apparatus ID that identifies one of the one or more second wireless communication apparatuses to or from which the second communication unit transmits or receives data; and a control step of controlling the second communication unit to transmit or receive the data to or from the one of the one or more second wireless communication apparatuses that corresponds to the apparatus ID acquired in the acquisition step.

A wireless communication method according to another aspect of the present invention for use in an information processing apparatus including a first communication unit configured to communicate with a first communication apparatus and a second communication unit configured to wirelessly communicate with each of one or more second wireless communication apparatuses includes an acquisition step of acquiring from the one or more second wireless communication apparatuses capable of communication via the second communication unit apparatus IDs that identify the corresponding one or more second wireless communication apparatuses in response to start of communication between the first communication unit and the first communication apparatus; a determination step of determining one of the apparatus IDs acquired in the acquisition step that corresponds to the one of the one or more second wireless communication apparatuses to or from which the second communication unit transmits or receives data; and a control step of controlling the second communication unit to transmit or receive the data to or from the one of the one or more second wireless communication apparatuses that corresponds to the one of the apparatus IDs determined in the determination step.

Accordingly, a portable information terminal that can transmit or receive data can be easily identified.

Further features of the present invention will become apparent from the following description of exemplary embodiments with reference to the attached drawings.

DESCRIPTION OF THE EMBODIMENTS

Embodiments of the present invention will now be described with reference to the drawings.
System Configuration First Embodiment A first embodiment of the present invention will be described.

In the first embodiment, a first wireless communication apparatus is, for example, a contactless ID card that holds personal information or the like, a second wireless communication apparatus is, for example, a portable information terminal, such as a cellular phone, a digital camera, or a USB memory, and an information processing apparatus has a wireless communication function. The information processing apparatus is, for example, an image processing apparatus 100 that converts data code received via a wireless unit into image data and that prints the image data. The image processing apparatus 100 may be a digital copying machine, a printer apparatus that is not provided with a scanner function, or other electronic apparatuses, such as a computer apparatus that performs image editing.

Figure 1:
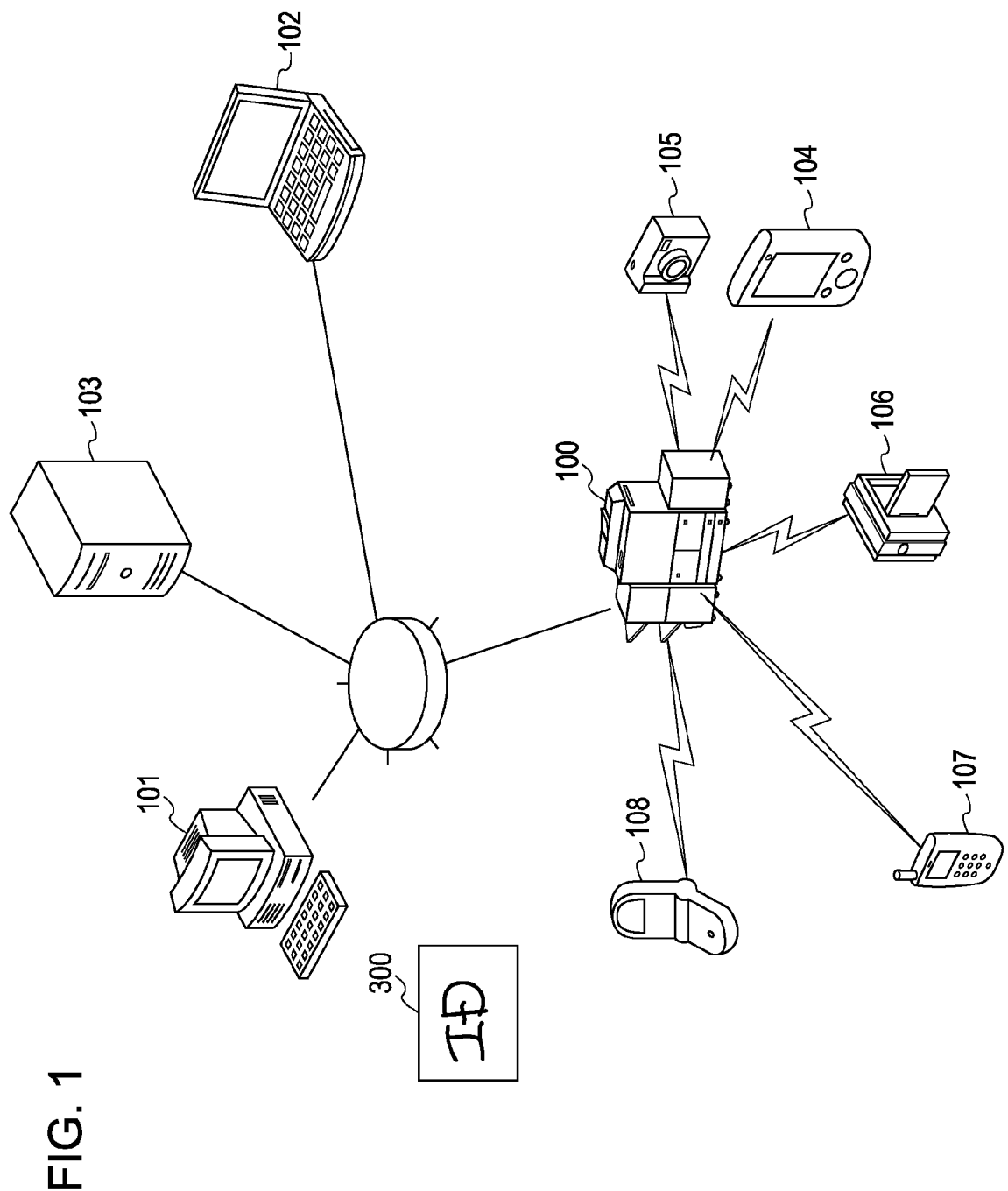
FIG. 1 illustrates a configuration of a data processing system to which an information processing apparatus and a portable information terminal according to a first embodiment can be applied.

FIG. 1 shows an example of a configuration of an information processing system according to the first embodiment including an information processing apparatus and portable information terminals.

Referring to FIG. 1, the information processing system includes the image processing apparatus 100 connected to a public Internet network or a LAN, to which personal computers (computers) 101 and 102 and a server computer 103 are connected. Portable information terminals (apparatuses 104 to 108) that are capable of wirelessly communicating with the image processing apparatus 100 are located around the image processing apparatus 100. The apparatuses 104 to 108 are, for example, a cellular phone, a digital camera, a notebook computer, a PDA, and a cellular phone containing FeliCa®, which is an example of a contactless ID card. In the first embodiment, communication between the image processing apparatus 100 and each of the apparatuses 104 to 108 is available via wireless communication using Bluetooth or a wireless LAN. However, the wireless communication system used here may be other types of wireless communication system.

A contactless ID card 300 is also capable of wirelessly communicating with the image processing apparatus 100. The contactless ID card 300 is used by a user to log into the image processing apparatus 100. Wireless communication between the contactless ID card 300 and the image processing apparatus 100 is performed via a wireless communication unit that is different from that used for wireless communication between the image processing apparatus 100 and each of the apparatuses 104 to 108. In the first embodiment, wireless communication between the contactless ID card 300 and the image processing apparatus 100 is performed based on the FeliCa system. However, obviously, other types of wireless communication unit may be used.

In the first embodiment, the apparatus 108 is configured such that the contactless ID card 300 is incorporated in a portable information terminal.

Figure 2:
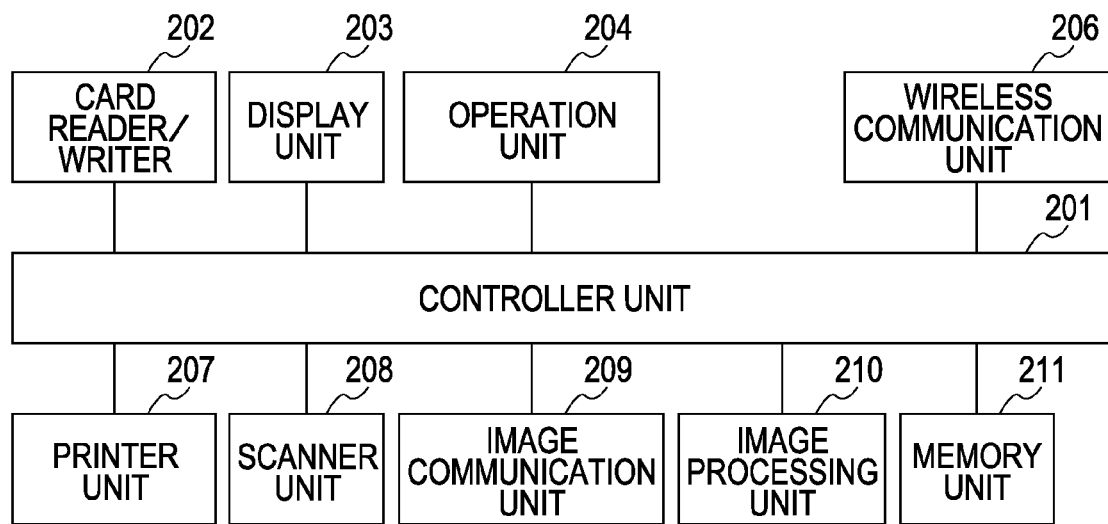
FIG. 2 is a block diagram showing a hardware configuration of an image processing apparatus shown in FIG. 1.

FIG. 2 is a block diagram showing a hardware configuration of the image processing apparatus 100 shown in FIG. 1. The image processing apparatus 100 according to the first embodiment is a multifunction peripheral (MFP) that is provided with a copy function, a printer function, a fax function, and a scanner function.

Referring to FIG. 2, a plurality of processing units is connected to a controller unit 201 that generally controls the entire image processing apparatus 100. The controller unit 201 contains a central processing unit (CPU) and a read-only memory (ROM), which are not shown in FIG. 2. A card reader/writer 202 wirelessly communicates with a contactless ID card, such as a FeliCa card.

A display unit 203 displays various user interface screens for giving instructions via an operation unit 204.

A wireless communication unit 206 is an interface for wirelessly communicating with each of the apparatuses 104 to 108. A printer unit 207 receives print jobs and image data from the computers 101 and 102 and the apparatuses 104 to 108 shown in FIG. 1 and performs printing. In addition, the printer unit 207 prints image data read with a scanner unit 208. An image processing unit 210 performs various types of image processing, such as compression/decompression, rotation, and variable magnification, on image data received by an image communication unit 209 or the like. A memory unit 211 includes a random-access memory (RAM), a hard disk, and the like.

When the contactless ID card 300 in which login information, which is necessary for logging into the image processing apparatus 100, is recorded in advance is brought close to the card reader/writer 202, the card reader/writer 202 receives a user's user ID from an integrated circuit (IC) contained in the contactless ID card 300. In the first embodiment, a case of the logging into the image processing apparatus 100 is described. However, a directory server (not shown) may be logged into. In this case, the image processing apparatus 100 transmits to the directory server the login information received via the card reader/writer 202.

Figure 3:
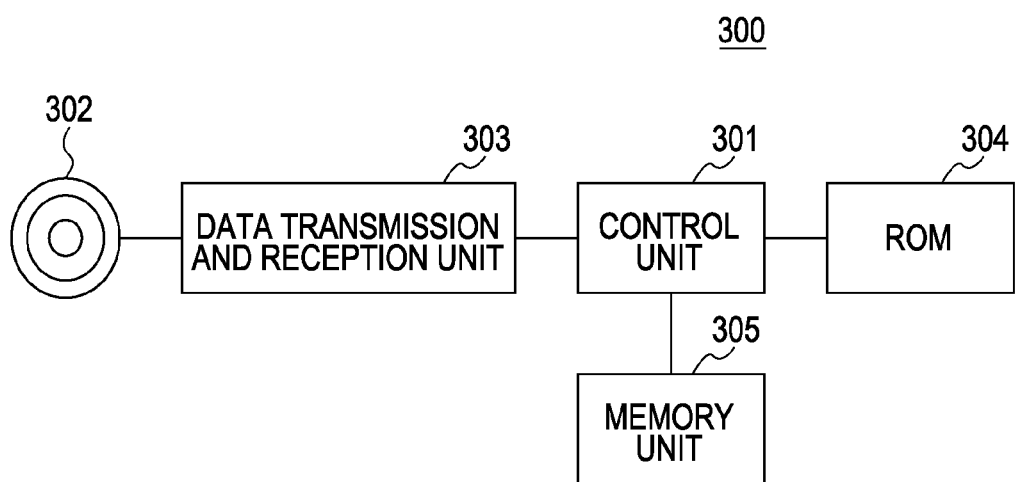
FIG. 3 is a block diagram showing a hardware configuration of a contactless ID card capable of communicating with a card reader/writer shown in FIG. 2.

In addition, by a user operation, a user ID necessary for login is transmitted to the contactless ID card 300, so that the user ID can be written to a memory unit 305 contained in the contactless ID card 300 shown in FIG. 3.

The display unit 203 indicates an instruction for a user operation and a print preview of an image to be printed. The display unit 203 is, for example, a liquid crystal panel.

The operation unit 204 is used by the user to select a desired operation via a key operation. For example, the display unit 203 and the operation unit 204 may be integrated with each other when the operation unit 204 is a liquid crystal touch panel. A user interface unit can be formed of the display unit 203 and the operation unit 204.

The wireless communication unit 206 includes an antenna section, a radio frequency (RF) section, and a baseband section that are used for data communication with a wireless communication apparatus, such as a portable information terminal, via a wireless communication system using Bluetooth or a wireless LAN. In the first embodiment, compared with communication via the card reader/writer 202, communication via the wireless communication unit 206 is capable of transferring a larger amount of data per unit time.

The printer unit 207 prints an electric image signal as a visible image on recording paper. The printer unit 207 includes a laser beam printer or an inkjet printer.

The scanner unit 208 includes an image sensor, a read driver, a light-source switch controller, and the like that are used for optically reading an original image and converting the original image into an electric image signal.

When the image sensor driven by the read driver of the scanner unit 208 performs scanning over the entire original, the light-source switch controller turns on a light source, such as a light-emitting diode (LED), contained in the image sensor. At the same time, a photosensor contained in the image sensor optically reads the original image and converts the read original image into an electric image signal.

The image communication unit 209 transmits and receives data to and from an external apparatus. The image communication unit 209 is connected to an Internet network or a LAN, connected to a public telephone circuit to perform facsimile communication, or connected to a personal computer via a USB interface. The wireless communication unit 206 is an interface used for wireless communication, whereas the image communication unit 209 is an interface used for wired communication. The image communication unit 209 is also capable of communication of data other than image data.

The image processing unit 210 performs image processing on image data. In image reading processing, the image processing unit 210 performs shading correction and the like on image data received from the scanner unit 208, and performs image processing, such as gamma control, binarization, half-tone processing, and color conversion from RGB to CMYK.

In addition, the image processing unit 210 performs resolution conversion on image data in accordance with a recording resolution of the printer unit 207. Furthermore, the image processing unit 210 performs processing, such as variable magnification, smoothing, and density correction of images, and outputs processed image data to a laser beam printer or the like.

The memory unit 211 is a memory device including a synchronous dynamic RAM (SDRAM) and a hard disk drive (HDD). The memory unit 211 temporarily stores image data. In addition, the memory unit 211 stores a control program and data used by the controller unit 201 to attain a function of the image processing apparatus 100.

The controller unit 201 generally controls the entire image processing apparatus 100. The controller unit 201 is electrically connected to each of the blocks, such as the printer unit 207 and the scanner unit 208. The controller unit 201 performs control to attain an advanced function.

For example, a copy function is provided when the controller unit 201 controls the scanner unit 208 to read image data of an original in order to attain a scanning function and controls the printer unit 207 to output the image data onto recording paper.

In addition, the controller unit 201 provides a scanner function to transmit image data read by the scanner unit 208 to a network through the image communication unit 209. Furthermore, the controller unit 201 provides a printer function to convert code data received from the network or the like through the image communication unit 209 into image data and to output the image data to the printer unit 207.

In addition, the controller unit 201 performs control to log into the image processing apparatus 100 using a user ID received from the contactless ID card 300 via the card reader/writer 202, and to control the display unit 203 to display a list of portable information terminals capable of communication via the wireless communication unit 206. Furthermore, the controller unit 201 controls communication performance of the wireless communication unit 206 in accordance with conditions of the image processing apparatus 100. In order to realize such control, a CPU (not shown) is provided in the controller unit 201.

FIG. 3 is a block diagram showing a hardware configuration of the contactless ID card 300, which is capable of communicating with the card reader/writer 202 shown in FIG. 2.

In a contactless ID card, an IC chip transmits and receives data via wireless communication using induced power obtained via a loop antenna by receiving external radio waves. The IC chip may be, for example, a radio-frequency identification (RFID) chip or a μ-chip.

The term "contactless ID card" is merely used in the first embodiment for the sake of convenience. For example, the term "contactless ID card" is a generic name indicating a device that includes a memory unit holding, for example, a user's user ID and the like and that performs wireless communication using external radio waves. Such a device is not necessarily a card as long as it has the above-described configuration. For example, such a device may be a cellular phone.

Each unit of the contactless ID card 300 according to the first embodiment will now be described with reference to FIG. 3.

Referring to FIG. 3, a control unit 301 executes a control program stored in a ROM 304, and controls an operation of the entire contactless ID card 300. The control unit 301 includes a CPU, which is not shown. A data transmission and reception unit 303 inputs and outputs data contained in radio waves transmitted and received via an antenna unit 302. Information and a program that are unique to the contactless ID card are stored in the ROM 304. Data input and output via the data transmission and reception unit 303 is stored in the memory unit 305. A portable information terminal ID, which will be described below, and user information (that is, a login name and a password) associated with the portable information terminal ID are stored in the memory unit 305.

As an operation of the contactless ID card 300, for example, when the data transmission and reception unit 303 receives a portable information terminal ID and a user ID, the control unit 301 controls the portable information terminal ID and the user ID to be written as registration information into the memory unit 305. The portable information terminal ID and user information (that is, a login name and a password) associated with the portable information terminal ID are stored in the memory unit 305.

As another operation of the contactless ID card 300, for example, the data transmission and reception unit 303 receives radio waves containing a portable information terminal ID issued from the card reader/writer 202 of the image processing apparatus 100. In response to the received portable information terminal ID being the same as a portable information terminal ID stored as registration information in the memory unit 305 of the contactless ID card 300, the control unit 301 controls the data transmission and reception unit 303 to transmit a user's user ID corresponding to the matched portable information terminal ID stored as registration information in the memory unit 305 of the contactless ID card 300.

In the first embodiment, the contactless ID card 300 wirelessly communicates with the image processing apparatus 100 using weak radio waves. Alternatively, instead of the contactless ID card, a contact ID card may be used. In this case, a reader/writer for a contact ID card can be used as the card reader/writer 202 of the image processing apparatus 100.

A configuration of a digital camera, which is an example of a second wireless communication apparatus 400 according to the first embodiment, will now be described.

Figure 4:
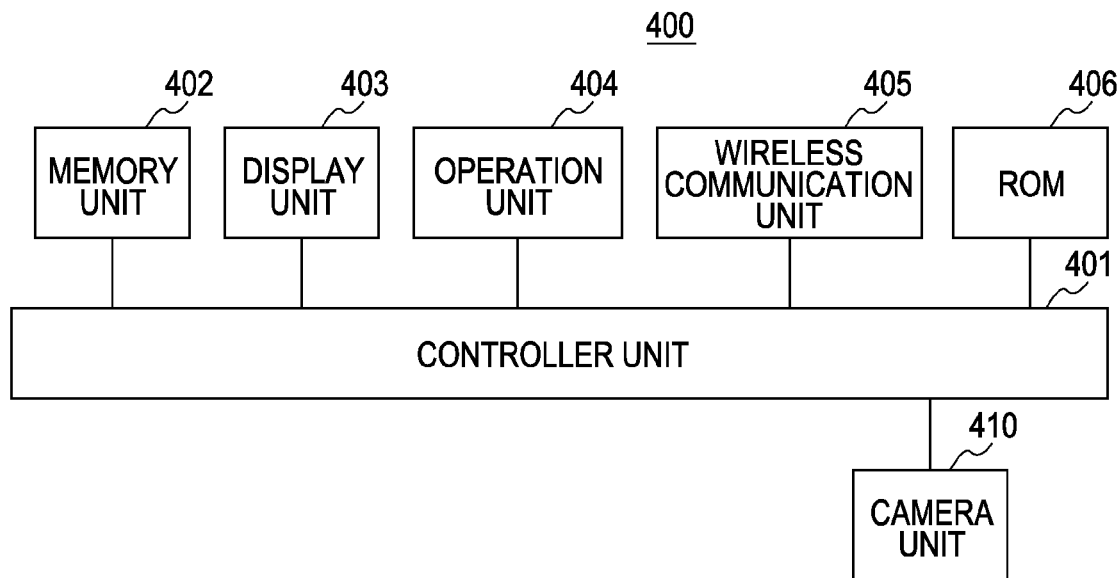
FIG. 4 is a block diagram showing a configuration of a second wireless communication apparatus according to the first embodiment.

FIG. 4 is a block diagram showing the configuration of the second wireless communication apparatus 400 according to the first embodiment. In this example, a digital camera is used as the second wireless communication apparatus 400.

Referring to FIG. 4, a controller unit 401 executes a control program stored in a ROM 406 and controls an operation of the entire digital still camera. The controller unit 401 includes a CPU (not shown). A wireless communication unit 405 performs data communication with an external apparatus via a wireless communication unit using Bluetooth or a wireless LAN. Wireless communication of image data captured by a camera unit 410 is performed via the wireless communication unit 405.

A display unit 403 is, for example, an LCD display unit that displays image data stored in a memory unit 402. An operation unit 404 includes various switches used for operating the digital camera. The camera unit 410 is an image-capturing unit that captures an image of a subject to generate a digital image. The image of the subject captured by the camera unit 410 is converted into digital image data and stored in the memory unit 402. A user ID that identifies a user who is permitted to use the second wireless communication apparatus 400 is stored in the memory unit 402 or the ROM 406.

For example, when the wireless communication unit 405 receives a user's user ID transmitted from the image processing apparatus 100, the controller unit 401 of the second wireless communication apparatus (digital camera) 400 determines whether or not the user's user ID is the same as the user ID stored in the memory unit 402 or the ROM 406. If the controller unit 401 determines that the user ID is valid, the controller unit 401 causes the second wireless communication apparatus (digital camera) 400 to enter a login mode in which the second wireless communication apparatus (digital camera) 400 is operable. In addition, when the wireless communication unit 405 receives a data transfer request from an external apparatus, the controller unit 401 controls an image to be transferred in response to the transfer request.

In FIG. 4, the second wireless communication apparatus (digital camera) 400 is used as a wireless communication apparatus. However, the wireless communication apparatus may be a terminal, such as a cellular phone, a PDA, or a notebook computer. A configuration of the wireless communication apparatus may be slightly different from the configuration shown in FIG. 4 depending on the type of apparatus. However, the configuration of each of the controller unit 401, the memory unit 402, the display unit 403, the operation unit 404, the wireless communication unit 405, and the ROM 406 is the same as that of the second wireless communication apparatus 400 irrespective of the type of apparatus.

Figure 10:
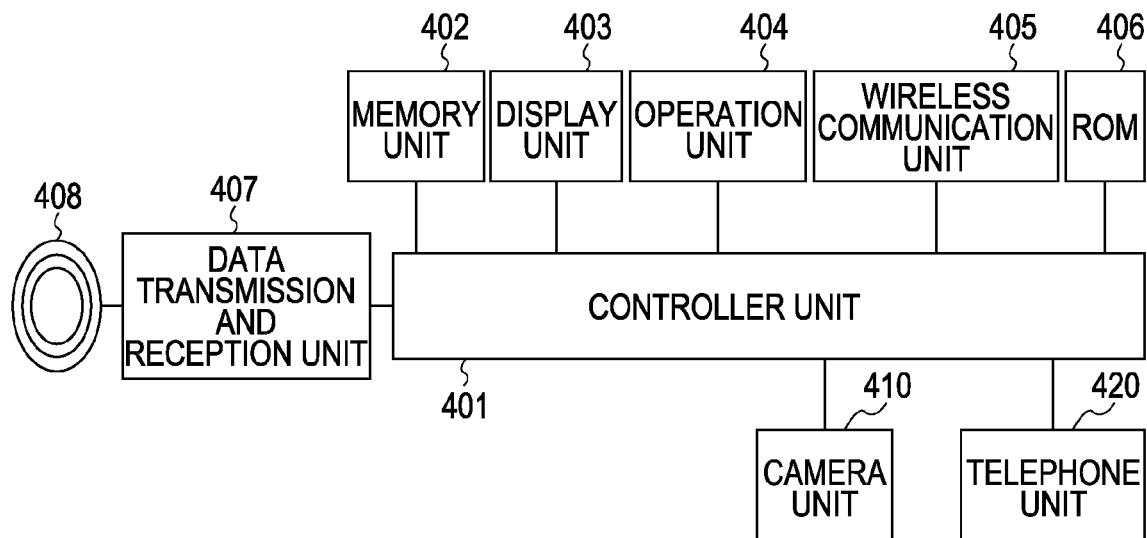
FIG. 10 is a block diagram showing a configuration in which a first wireless communication apparatus and a second wireless communication apparatus are integrated with each other according to an embodiment of the present invention.

FIG. 10 is a block diagram for explaining a configuration of a cellular phone containing FeliCa, which is an example of a wireless communication apparatus 1000 according to the first embodiment including the first wireless communication apparatus and the second wireless communication apparatus that are integrated with each other. The apparatus 108 shown in FIG. 1 has the configuration shown in FIG. 10.

Referring to FIG. 10, the wireless communication apparatus 1000 further includes a data transmission and reception unit 407, an antenna unit 408, and a telephone unit 420 connected to the controller unit 401, in addition to the configuration shown in FIG. 4. The same component parts as in FIG. 4 are referred to with the same reference numerals, and the descriptions of those same parts will be omitted.

The data transmission and reception unit 407 has a configuration similar to the data transmission and reception unit 303 of the contactless ID card 300 shown in FIG. 3. The data transmission and reception unit 407 is configured to transmit and receive data via wireless communication using an IC chip. The IC chip is formed of the antenna unit 408 and the data transmission and reception unit 407. The antenna unit 408 has a configuration similar to the antenna unit 302 of the contactless ID card 300 shown in FIG. 3. The antenna unit 408 is configured to transmit and receive radio waves used in wireless communication using the IC chip.

In the wireless communication apparatus 1000, when the data transmission and reception unit 407 receives via the antenna unit 408 radio waves containing a portable information terminal ID and a user ID, the controller unit 401 controls the portable information terminal ID and the user ID to be written as registration information into the memory unit 402. The portable information terminal ID and user information (that is, a login name and a password) associated with the portable information terminal ID are stored in the memory unit 402. When the data transmission and reception unit 407 receives via the antenna unit 408 radio waves containing a portable information terminal ID issued from the card reader/writer 202 of the image processing apparatus 100, the controller unit 401 controls the data transmission and reception unit 407 to transmit a user's user ID corresponding to a portable information terminal ID stored in the memory unit 402 that is the same as the portable information terminal ID received from the card reader/writer 202 of the image processing apparatus 100.

The processing operation according to the first embodiment will now be described with reference to flowcharts shown in FIGS. 5 to 7.

Figure 5:
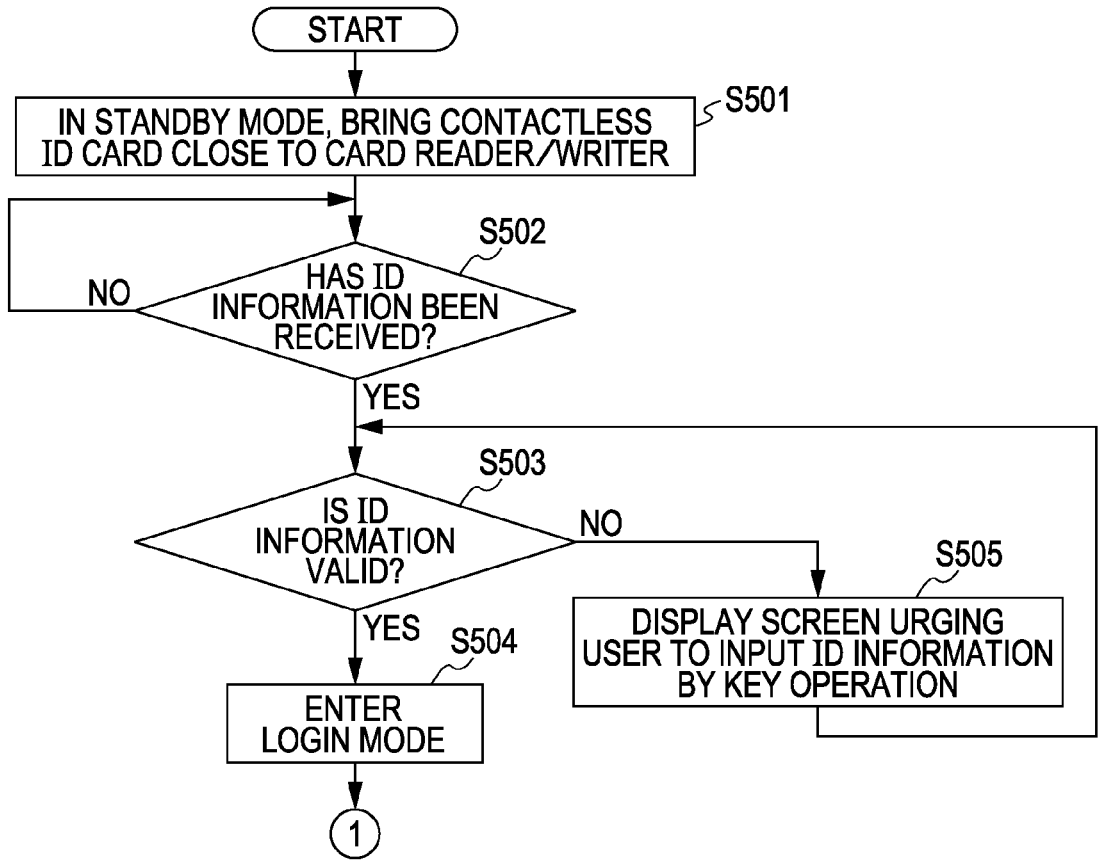
FIG. 5 is a flowchart showing an example of a first data process performed by an information processing system according to the first embodiment.
Figure 6:
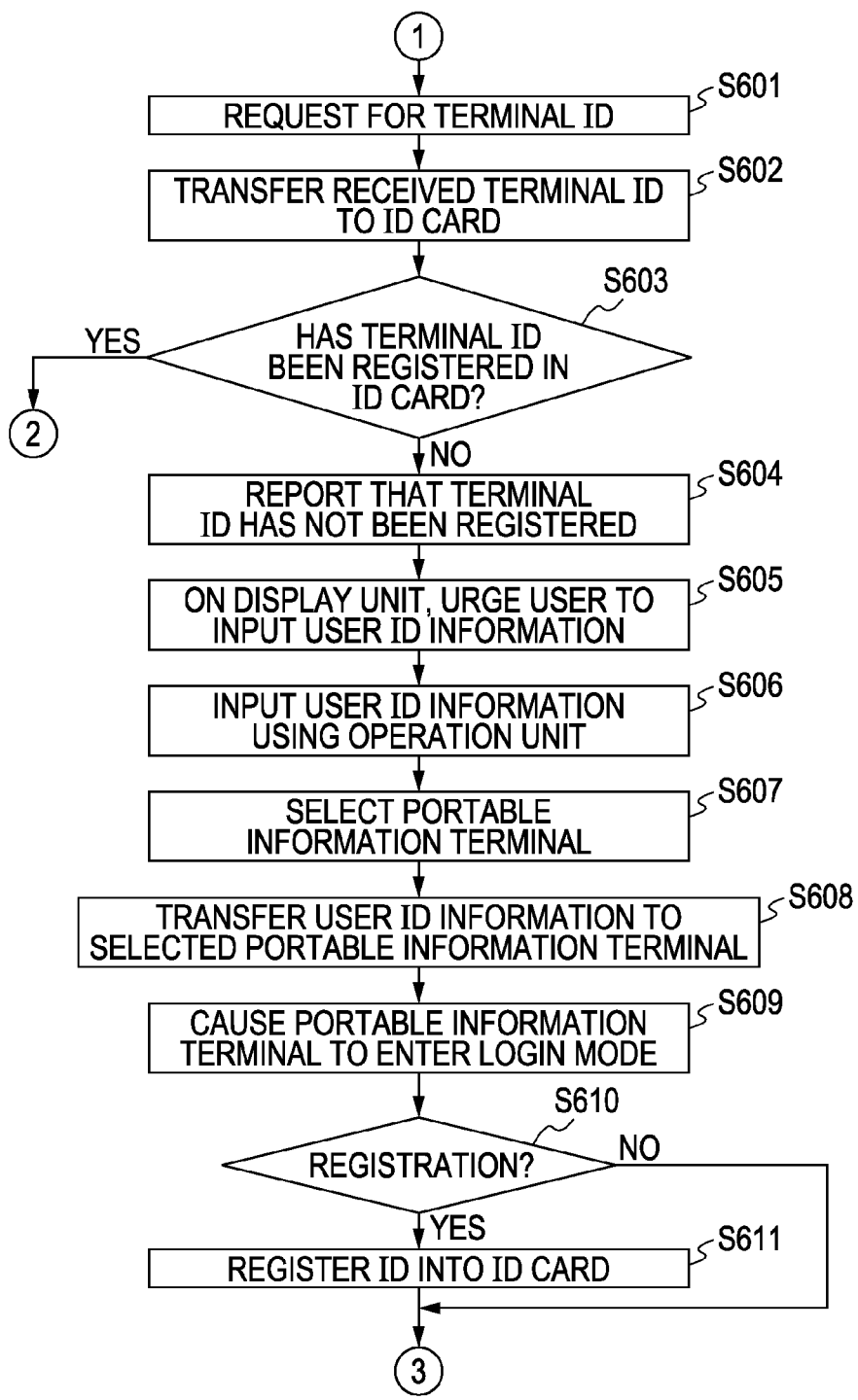
FIG. 6 is a flowchart showing an example of a data process performed by the information processing system according to the first embodiment.
Figure 7:
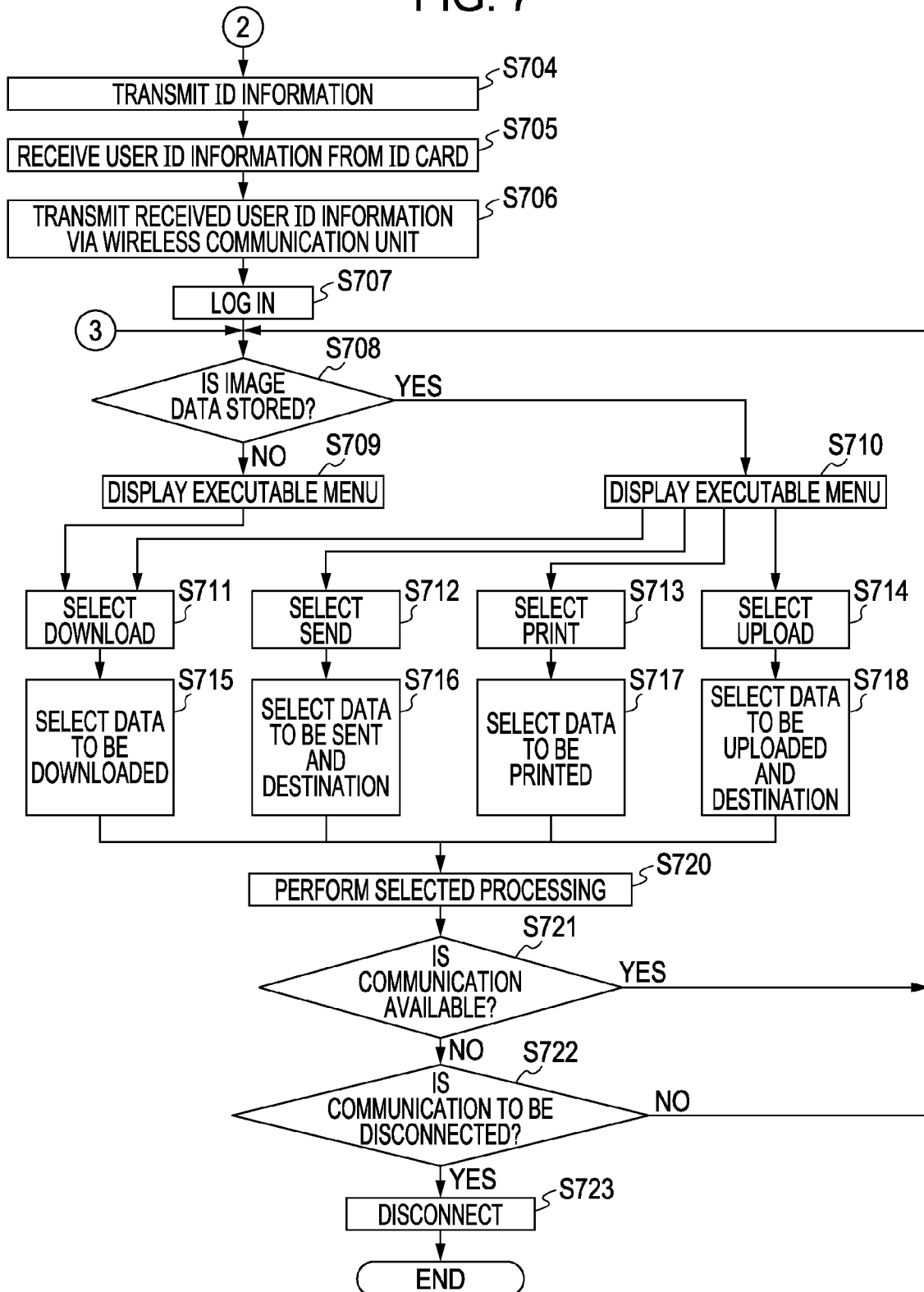
FIG. 7 is a flowchart showing an example of a data process performed by the information processing system according to the first embodiment.

FIGS. 5 to 7 are flowcharts showing an example of a first data process performed by the information processing system according to the first embodiment.

The image processing apparatus 100, the contactless ID card 300, or the wireless communication apparatus 1000 containing the contactless ID card 300 performs processing of the flowcharts shown in FIGS. 5 to 7.

The user brings the contactless ID card 300, which has been issued for the user, close to the card reader/writer 202 of the image processing apparatus 100 in a standby mode (step S501). Instead of the contactless ID card 300, the wireless communication apparatus 1000 containing a contactless ID card may be used. Although processing of each step in the case of the contactless ID card 300 will be described, the wireless communication apparatus 1000 may be used instead of the contactless ID card 300.

The card reader/writer 202 always emits weak radio waves containing a terminal ID indicating the ID of the image processing apparatus 100.

The weak radio waves are dependent on a communication environment, such as a characteristic of an antenna. The range of such weak radio waves is typically about 10 cm. When the contactless ID card 300 is brought close to the area in which the contactless ID card 300 is capable of communicating with the card reader/writer 202, the IC chip contained in the contactless ID card 300 receives the weak radio waves and is activated. Then, the IC chip acquires via wireless communication the terminal ID contained in the radio waves. The IC chip transmits a user ID stored in the contactless ID card 300 to the image processing apparatus 100 via the data transmission and reception unit 303 and the antenna unit 302. The "user ID" includes a login name and a password that allow, for example, the image processing apparatus 100 to be operable.

In step S502, the image processing apparatus 100 determines whether or not the card reader/writer 202 has received the user ID transmitted from the contactless ID card 300. If it is determined in step S502 that the card reader/writer 202 has received the user ID, the process proceeds to step S503. If it is determined in step S502 that the card reader/writer 202 has not received the user ID, the image processing apparatus 100 waits until the card reader/writer 202 receives the user ID in step S502. In step S503, the controller unit 201 determines whether or not the user ID received from the contactless ID card 300 is valid. In order to perform determination of the validity of the user ID, a valid user ID is held in advance in the memory unit 211. The controller unit 201 determines whether the received user ID is valid or not by comparing the received user ID with the user ID held in the memory unit 211.

If the controller unit 201 determines in step S503 that a valid user ID has not been received from the contactless ID card 300, the controller unit 201 causes the display unit 203 to display a screen for urging the user to input a user ID via a key operation using the operation unit 204 (step S505). Then, the process returns to step S503. When the process returns from step S505 to step S503, the controller unit 201 determines whether or not the user ID input via the key operation using the operation unit 204 is valid in step S503. If the controller unit 201 determines in step S503 that a valid user ID has not been received from the contactless ID card 300, the controller unit 201 determines that an error has occurred. In this case, the process may be terminated without proceeding to step S505.

In contrast, if the controller unit 201 determines in step S503 that the received user ID is valid, the controller unit 201 causes the image processing apparatus 100 to enter an operable mode (that is, a login mode) (step S504).

A case where an IC chip contained in the wireless communication apparatus 1000, instead of the contactless ID card 300, communicates with the image processing apparatus 100 using weak radio waves and the image processing apparatus 100 enters the login mode in step in S504 will now be explained. In this case, the wireless communication unit 405 of the wireless communication apparatus 1000 may not be capable of communicating with the image processing apparatus 100. In such a case, in step S504, the wireless communication unit 405 starts communication with the image processing apparatus 100 via a wireless LAN or the like. For such communication, the information necessary for performing wireless communication via the wireless LAN or the like is acquired via wireless communication using weak radio waves using an IC chip.

Then, in order to determine whether or not a portable information terminal that is capable of wireless communication is located within a wireless communication area, the wireless communication unit 206 of the image processing apparatus 100 requests portable information terminals to transmit respective IDs for identifying the portable information terminals (hereinafter, referred to as portable information terminal IDs) (step S601). More specifically, when the wireless communication unit 206 of the image processing apparatus 100 performs wireless communication via a wireless LAN, such as the IEEE 802.11a/b/g/n, the wireless communication unit 206 performs the processing of step S601 by a broadcasting procedure or the like. In the example shown in FIG. 1, the image processing apparatus 100 requests the apparatuses 104 to 108 to transmit respective portable information terminal IDs.

In response to the request for transmission of a terminal ID, the portable information terminals transmit the respective portable information terminal IDs to the image processing apparatus 100. The controller unit 201 of the image processing apparatus 100 causes the card reader/writer 202 to transmit the received one or more portable information terminal IDs to the contactless ID card 300 (step S602). This processing is performed in order to determine whether or not the portable information terminal IDs received by the wireless communication unit 206 have been registered in the memory unit 305 of the contactless ID card 300.

The control unit 301 of the contactless ID card 300 determines whether or not each of the received portable information terminal IDs has been registered in the memory unit 305 (step S603). If the control unit 301 determines in step S603 that the portable information terminal ID has been registered, the process proceeds to step S704 (see FIG. 7).

In contrast, if the control unit 301 determines in step S603 that the received portable information terminal ID has not been registered, the process proceeds to step S604.

In step S604, the control unit 301 informs the image processing apparatus 100 that the received terminal ID has not been registered in the contactless ID card 300. Then, the process proceeds to step S605.

In step S605, the controller unit 201 controls the display unit 203 to display a screen urging the user to input a login name and a password (that is, a user ID). The login name and the password allow a portable information terminal that is to communicate with the image processing apparatus 100 to be operable. The login name and the password that allow the portable information terminal to be operable is information that allows only a particular user to use the portable information terminal and that is stored in advance in the corresponding portable information terminal (the corresponding one of the apparatuses 104 to 108). In the first embodiment, the login name and the password that allow the portable information terminal to be operable are different from the login name and the password that are used for logging into the image processing apparatus 100 in the processing of steps S501 to S505 shown in FIG. 5. The login name is not necessarily used. Only the password may be used.

The user inputs the login name and the password using the operation unit 204 to log into the portable information terminal in accordance with the screen displayed on the display unit 203, and the image processing apparatus 100 receives the input entered by the user (step S606). The image processing apparatus 100 displays on the display unit 203 a list of portable information terminals capable of wireless communication. The user selects, using the operation unit 204, a desired portable information terminal from the list, and the image processing apparatus 100 receives the instruction given by the user (step S607). The list of portable information terminals displayed on the display unit 203 corresponds to portable information terminals whose portable information terminal IDs are received from among the portable information terminals acquired by the determination in step S601. The processing of step S606 and step S607 may be performed in the reverse order.

The wireless communication unit 206 transmits the received login name and password to the portable information terminal selected in step S607 by the user (step S608).

The selected portable information terminal receives from the image processing apparatus 100 the login name and the password input in step S606, and verifies the login name and the password. If the login name and the password are valid, the portable information terminal enters a login mode (step S609). If it is determined that the login name and the password received by the portable information terminal are not valid, the process is terminated.

The controller unit 201 displays on the display unit 203 a screen urging the user to designate whether or not the portable information terminal ID of the portable information terminal into which the user is logging is to be registered in the contactless ID card 300 (step S610).

When the user designates that the portable information terminal ID is to be registered in the contactless ID card 300, the portable information terminal ID of the portable information terminal into which the user is logging is transmitted from the card reader/writer 202 to the contactless ID card 300.

The IC chip contained in the contactless ID card 300 writes the received portable information terminal ID into the memory unit 305 (step S611), and the process proceeds to step S708 of FIG. 7.

Processing of step S704 and the subsequent processing shown in FIG. 7 will now be described.

In step S704, a login name and a password used to log into the portable information terminal that is identified by the portable information terminal ID registered in the contactless ID card 300 are transmitted to the image processing apparatus 100. The login name and the password transmitted in step S704 are stored in the memory unit 305 of the contactless ID card 300 in association with the portable information terminal ID. In addition, the image processing apparatus 100 is informed of the existence of the portable information terminal ID registered in the contactless ID card 300 among one or more portable information terminal IDs received from the image processing apparatus 100 in step S602 and the portable information terminal ID registered in the contactless ID card 300.

The image processing apparatus 100 receives via the card reader/writer 202 the portable information terminal ID, the login name, and the password (step S705) from the contactless ID card 300. The controller unit 201 of the image processing apparatus 100 controls the login name and the password received from the contactless ID card 300 to be transmitted to the portable information terminal identified by the portable information terminal ID received from the contactless ID card 300 (step S706). The portable information terminal receives the login name and the password from the image processing apparatus 100, and verifies the login name and the password. If the login name and the password are valid, the portable information terminal enters the login mode. If it is determined that the login name and the password received by the portable information terminal are not valid, the process is terminated. After the portable information terminal enters the login mode, the portable information terminal informs the image processing apparatus 100 that a login process has been normally performed. The image processing apparatus 100 is informed of the completion of the login process from the portable information terminal, and recognizes the portable information terminal as the terminal to or from which data is to be transmitted or received when a job that will be instructed by the user is performed (step S707).

By the above-described processing, the user has successfully logged into the image processing apparatus 100 and the portable information terminal. In addition, the image processing apparatus 100 is capable of identifying the portable information terminal into which the user has logged. Thus, when a job that will be designated by the user is performed, the image processing apparatus 100 is capable of identifying the portable information terminal to or from which data is to be transmitted or received. For example, in a case where a plurality of apparatuses, such as the apparatuses 104 to 108, is capable of communicating with the image processing apparatus 100, as shown in FIG. 1, even when the user instructs the image processing apparatus 100 to execute a job of receiving image data from a portable information terminal and performing printing, the image processing apparatus 100 is capable of uniquely identifying the portable information terminal to which a request to transfer the image data is to be given.

After logging into the portable information terminal is completed, the image processing apparatus 100 recognizes that the apparatus with which the image processing apparatus 100 wirelessly communicates is the portable information terminal. Then, the image processing apparatus 100 determines whether or not image data is stored in the memory of the portable information terminal (step S708). This determination is realized when the image processing apparatus 100 queries the portable information terminal as to existence of the image data, and the determination is performed in accordance with a response from the portable information terminal with respect to the query.

If the image data is not stored in the memory of the portable information terminal, the process proceeds to step S709. In step S709, a menu indicating a job executable by cooperation between the image processing apparatus 100 and the portable information terminal is displayed on the display unit 203 of the image processing apparatus 100. In the processing of step S709, since the image data is not stored in the memory of the portable information terminal, a job involving processing of transferring the image data from the portable information terminal to the image processing apparatus 100 is not displayed in the menu. For example, a job, such as "printing data stored in the portable information terminal" is not displayed in the menu. In contrast, a job of transferring an image from the image processing apparatus 100 to the portable information terminal is displayed in the menu. It is determined whether or not image data is stored in the memory of the portable information terminal, and only an executable job is displayed on the display unit 203 such that only the executable job can be selected. This prevents the user from selecting a job that cannot be executed.

Figure 11:
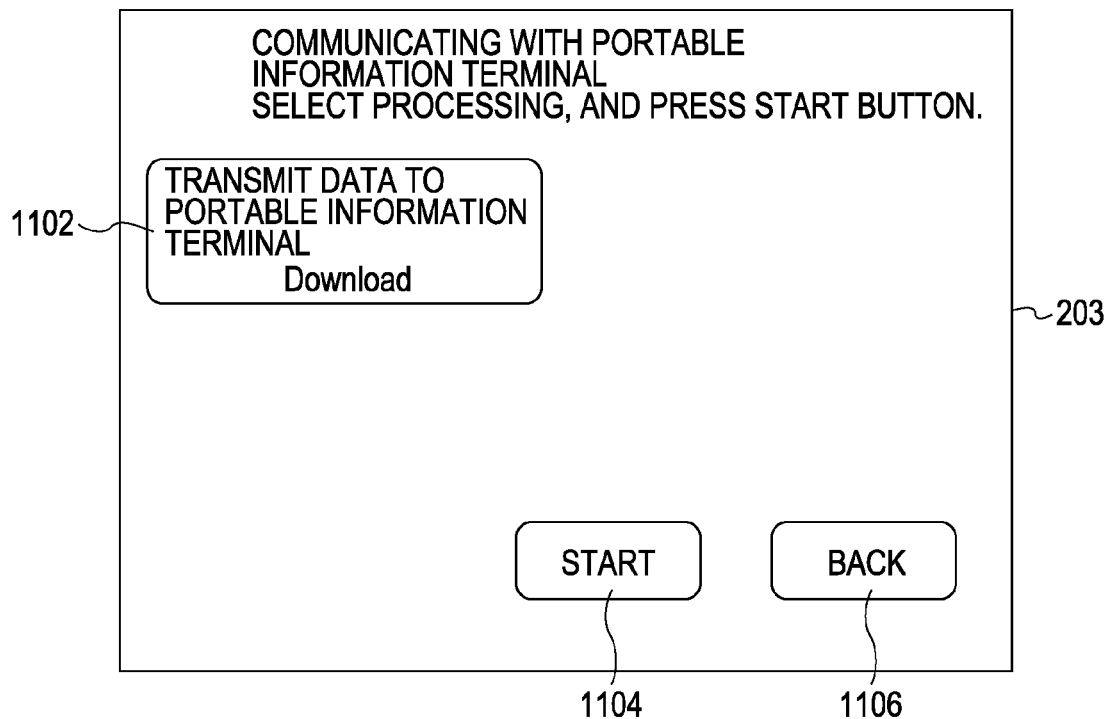
FIG. 11 shows an example of a screen displayed on a display unit.

FIG. 11 shows an example of the screen displayed on the display unit 203 of the image processing apparatus 100 in step S709. Referring to FIG. 11, the display unit 203 includes a touch panel. Thus, the display unit 203 has both the functions of the display unit 203 and the operation unit 204 (the same is applied to examples shown in FIGS. 12 and 13).

On the display unit 203 of the image processing apparatus 100, a button 1102 for instructing transmission (downloading) of data to the portable information terminal is displayed in a menu. When the user presses the button 1102 and then presses a "start" button 1104, a screen for adjusting detailed settings to execute a job is displayed. When the user presses a "back" button 1106, the original screen displayed before the button 1102 is pressed is displayed.

If it is determined in step S708 that the image data is stored in the memory of the portable information terminal, the process proceeds to step S710. A menu indicating a job that can be executed is displayed on the display unit 203 of the image processing apparatus 100 (step S710).

Figure 12:
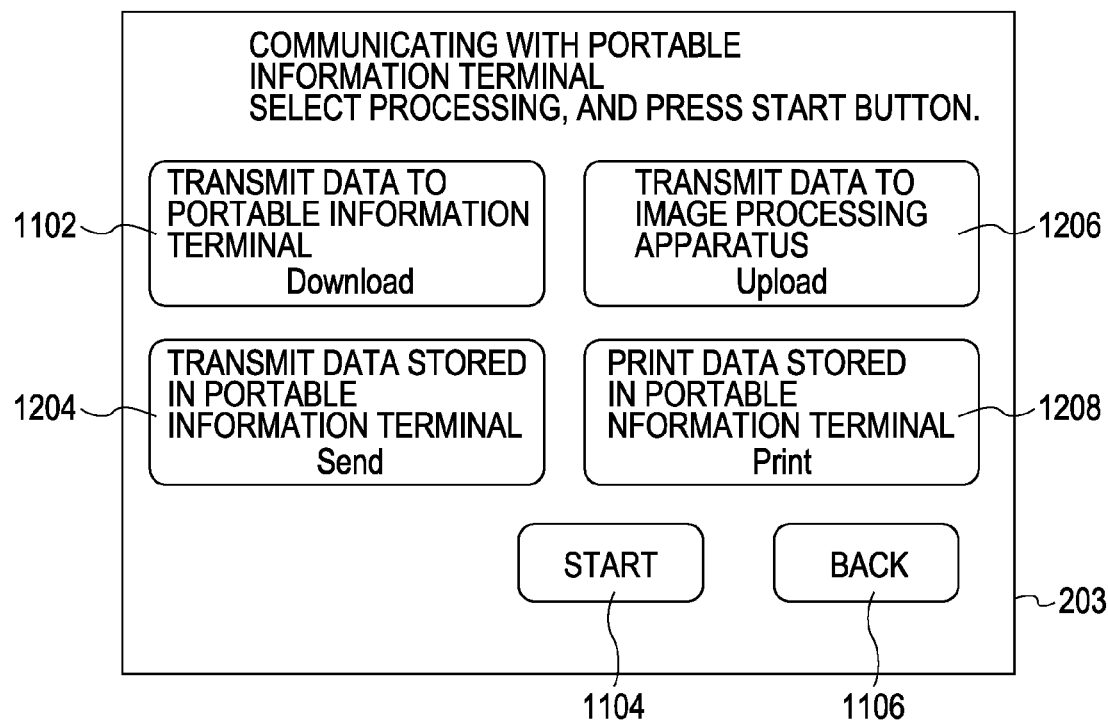
FIG. 12 shows an example of another screen displayed on the display unit.

FIG. 12 shows an example of the screen displayed on the display unit 203 of the image processing apparatus 100 in step S710. In the processing of step S710, since the image data is stored in the memory of the portable information terminal, a job involving processing of transferring the image data from the portable information terminal to the image processing apparatus 100 is displayed in the menu, in addition to the screen shown in FIG. 11. In FIG. 12, the same buttons as in FIG. 11 are referred to with the same reference numerals, and the explanation of those same buttons will be omitted.

A button 1204 for instructing transmission of data stored in the portable information terminal is used for instructing a job of causing the image processing apparatus 100 to receive the image data stored in the portable information terminal and to transmit the image data via facsimile, an electronic mail, or the like using a transmission function provided in the image processing apparatus 100.

A button 1206 for instructing transmission (uploading) of data to the image processing apparatus is used for instructing a job of transferring the image data from the portable information terminal to the image processing apparatus 100 and storing the image data into the memory unit 211 of the image processing apparatus 100.

A button 1208 for instructing printing of data stored in the portable information terminal is used for instructing a job of causing the image processing apparatus 100 to receive the image data stored in the portable information terminal and to perform printing. When the button 1102, 1204, 1206, or 1208 is pressed, a corresponding screen for adjusting detailed settings to execute a corresponding instructed job is displayed.

On the screen shown in FIG. 11 or 12, when the user presses the button 1102 for instructing transmission of data to the portable information terminal and the image processing apparatus 100 receives the depression of the button 1102 (step S711), the process proceeds to step S715. In step S715, image data to be transmitted (downloaded) to the portable information terminal is selected. For example, the user selects the image data stored in the memory unit 211 of the image processing apparatus 100 or performs an operation to designate transmission of image data obtained by reading an original image with the scanner unit 208, and the image processing apparatus 100 receives an instruction from the user.

When the user presses the button 1204 for instructing transmission of data stored in the portable information terminal on the screen shown in FIG. 12 and the image processing apparatus 100 receives the depression of the button 1204 (step S712), the process proceeds to step S716. In step S716, an operation for designating the image data stored in the portable information terminal and an operation for designating a telephone number or an electronic mail address as a destination to which the image data is to be transmitted are received.

When the user presses the button 1208 for instructing printing of data stored in the portable information terminal on the screen shown in FIG. 12 and the image processing apparatus 100 receives the depression of the button 1208 (step S713), the process proceeds to step S717. In step S717, an operation for designating the image data stored in the portable information terminal and adjusting detailed settings for printing the image data (for example, color/monochrome, selection of paper, and finishing) are received.

When the user presses the button 1206 for instructing transmission of data to the image processing apparatus is pressed on the screen shown in FIG. 12 and the image processing apparatus 100 receives the depression of the button 1206 (step S714), the process proceeds to step S718. In step S718, an operation of designating the image data stored in the portable information terminal and an operation for designating a directory in the memory unit 211 as a destination in which the image data is to be stored are received.

In step S720, the image processing apparatus 100 executes the corresponding job in accordance with the instruction received in corresponding processing from among the processing of steps S711 to S718. The apparatus to or from which the image data is to be transmitted or received is the portable information terminal into which the user has logged.

After the execution of the job is completed, the process proceeds to step S721. In step S721, it is determined whether or not communication between the image processing apparatus 100 and the contactless ID card 300 is available. The determination of whether or not the communication is available is based on determination of whether or not the communication between the contactless ID card 300 and the image processing apparatus 100 can be performed using weak radio waves.

Figure 13:
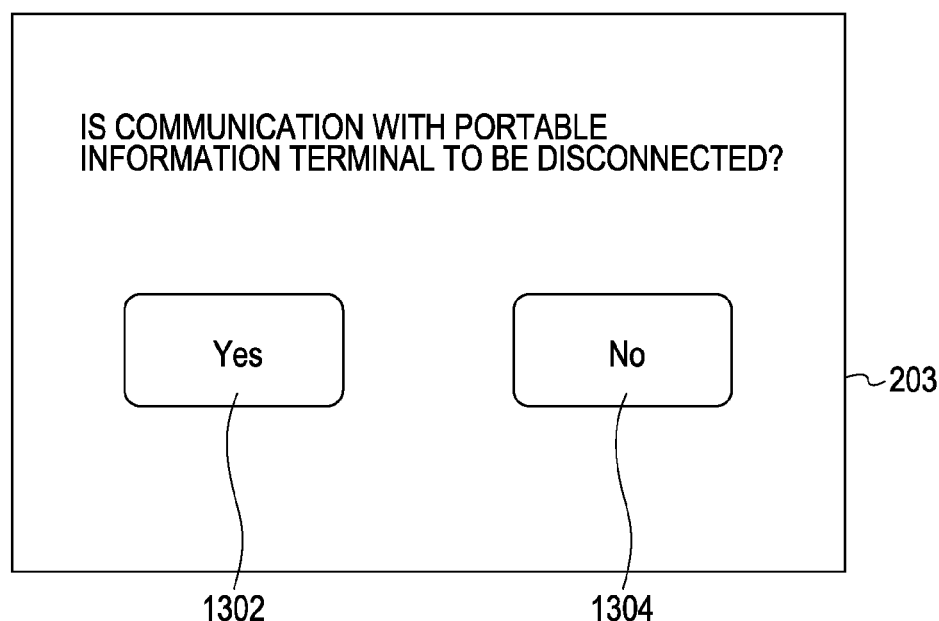
FIG. 13 shows an example of a further screen displayed on the display unit.

If it is determined in step S721 that the communication is not available, the process proceeds to step S722. In step S722, a screen shown in FIG. 13 is displayed on the display unit 203 of the image processing apparatus 100. The screen shown in FIG. 13 urges the user to determine whether or not to continue the communication between the portable information terminal and the image processing apparatus 100 via a wireless LAN or the like. If the user presses a YES button 1302 shown in FIG. 13, the wireless communication between the image processing apparatus 100 and the portable information terminal is disconnected (step S723), and the process is terminated. In contrast, if the user presses a NO button 1304, the wireless communication between the image processing apparatus 100 and the portable information terminal is continued, and the process proceeds to step S708. Thus, another job can be executed. If it is determined in step S721 that the communication is available, the process proceeds to step S708.

According to the first embodiment, when the user performs an operation of only bringing the contactless ID card 300 close to the image processing apparatus 100, logging into the image processing apparatus 100 and identification of a portable information terminal can be achieved. In addition, since an appropriate execution menu is automatically displayed on the display unit 203 in accordance with presence or absence of image data in the memory of the portable information terminal, the user is able to easily select a desired job.

In addition, according to the first embodiment, with the contactless ID card 300 used for login in order to use the image processing apparatus 100, information of the portable information terminal used by the user can be registered in the contactless ID card 300. That is, the portable information terminal that performs wireless communication can be easily identified with minimal burden on the user, and processing for logging into the information processing apparatus can be quickly completed. In addition, executable processing can be easily identified in accordance with conditions of the portable information terminal and can be executed. In addition, a communication unit used for communication with the portable information terminal can be easily identified. Thus, processing to be desired by the user can be executed via the communication unit that is identified in advance.

Second Embodiment

In a second embodiment, a case where a plurality of pieces of information each identifying a second wireless communication apparatus that is to communicate with a wireless communication apparatus is registered in a first communication apparatus will be described.

More specifically, in the second embodiment, a user owns a plurality of portable information terminals capable of wireless communication and the user desires to establish communication between one of the plurality of portable information terminals and a wireless communication apparatus.

Since the configuration of the entire system, the configuration of the image processing apparatus, the configuration of each of the portable information terminals, and the configuration of the contactless ID card are the same as in the first embodiment, they will not be explained here.

Figure 8:
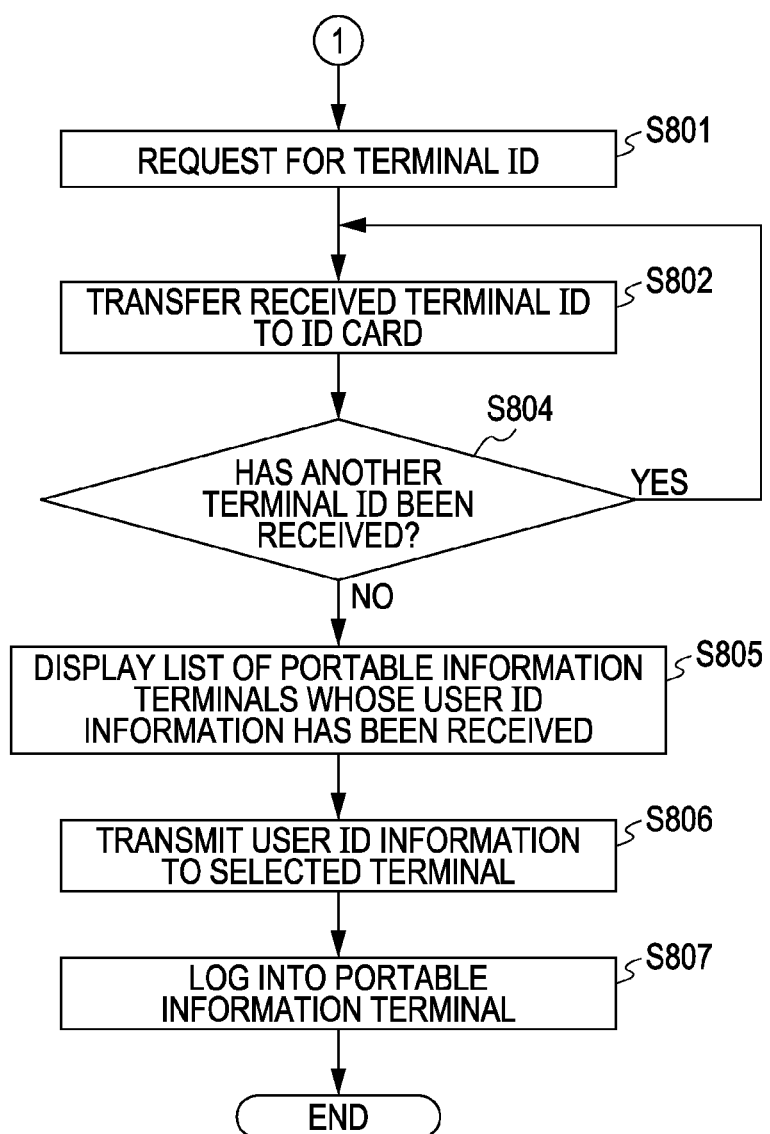
FIG. 8 is a flowchart showing an example of a data process performed by an information processing system according to a second embodiment.

A process according to the second embodiment will now be described with reference to a flowchart shown in FIG. 8. FIG. 8 is a flowchart showing an example of a data process performed by an information processing system according to the second embodiment. The image processing apparatus 100, the contactless ID card 300, or the wireless communication apparatus 1000 containing a contactless ID card performs processing of steps S801 to S807.

The user brings the contactless ID card 300 functioning as a first communication apparatus owned by the user close to the card reader/writer 202 of the image processing apparatus 100 to log into the image processing apparatus 100. Since the processing for logging into the image processing apparatus 100 is similar to the processing shown by the flowchart of FIG. 5, the explanation of the processing will be omitted.

After logging into the image processing apparatus 100 is completed, the process proceeds to step S801 of FIG. 8.

In order to determine whether or not a portable information terminal that is capable of wireless communication is located within a range in which wireless communication is available, the wireless communication unit 206 of the image processing apparatus 100 requests for a portable information terminal ID (step S801). The processing of step S801 is the same as the processing of step S601 shown in FIG. 6.

In response to the request from the image processing apparatus 100, at least one of the plurality of portable information terminals (that is, at least one of the apparatuses 104 to 108 shown in FIG. 1) transmits a corresponding portable information terminal ID to the image processing apparatus 100. If no portable information terminal ID is transmitted, it is determined that no portable information terminal that is capable of communicating with the image processing apparatus 100 via a wireless LAN or the like exists, and the process is terminated.

In order to determine whether or not the portable information terminal ID of the portable information terminal received by the wireless communication unit 206 has been registered in the memory unit 305 of the contactless ID card 300, the controller unit 201 of the image processing apparatus 100 performs the subsequent processing. That is, the controller unit 201 causes the card reader/writer 202 to transmit the received portable information terminal ID of the portable information terminal to the contactless ID card 300 (step S802).

Then, the controller unit 201 determines whether or not another portable information terminal ID has been received (step S804).

If the controller unit 201 determines that another portable information terminal ID has been received, the process returns to step S802 to transmit the received portable information terminal ID of the portable information terminal to the contactless ID card 300.

The control unit 301 of the contactless ID card 300 determines whether or not the received portable information terminal ID of the portable information terminal has been registered in the memory unit 305. If the control unit 301 determines that the portable information terminal ID has been registered in the memory unit 305, a user ID (that is, a login name and a password) corresponding to the portable information terminal ID is transmitted to the image processing apparatus 100. In the second embodiment, since the plurality of portable information terminal IDs has been registered in the memory unit 305, the login names and the passwords corresponding to the respective portable information terminal IDs are transmitted from the contactless ID card 300 to the image processing apparatus 100. A plurality of pairs of portable information terminal IDs and user IDs (that is, login names and passwords) corresponding to the respective portable information terminals is stored in the memory unit 305 of the contactless ID card 300.

As described above, the processing of steps S802 to S804 is repeated. The image processing apparatus 100 queries as to user IDs corresponding to all the respective received portable information terminal IDs. Thus, portable information terminal IDs registered in the contactless ID card 300 and login names and passwords to log into the respective portable information terminals can be acquired.

The processing given below may be performed instead of performing the loop of the processing of steps S802 to S804. That is, the image processing apparatus 100 waits for a response from a portable information terminal, and transmits to the contactless ID card 300 one or more portable information terminal IDs received during a predetermined period of time. The contactless ID card 300 determines whether or not each of the received one or more portable information terminal IDs is the same as a portable information terminal ID registered in the contactless ID card 300. If one of the received one or more portable information terminal IDs is the same as a portable information terminal ID registered in the contactless ID card 300, the contactless ID card 300 transmits to the image processing apparatus 100 the portable information terminal ID and a login name and a password that correspond to the portable information terminal ID.

In step S805, the controller unit 201 of the image processing apparatus 100 displays on the display unit 203 a list of the plurality of portable information terminals corresponding to the portable information terminal IDs received from the contactless ID card 300. Then, the controller unit 201 urges the user to select one of the plurality of portable information terminals to be used for wireless communication.

In step S806, for example, the controller unit 201 of the image processing apparatus 100 causes the wireless communication unit 206 to transmit the login name and the password to the selected portable information terminal. In step S807, the user also logs into the selected portable information terminal. Then, the process is terminated.

Thus, image data and the like can be transferred between the image processing apparatus 100 and the portable information terminal.

As described above, according to the second embodiment, since a wireless communication apparatus identifies a plurality of second wireless communication apparatuses in accordance with information received from a first wireless communication apparatus and a user selects one of the plurality of portable information terminals, logging into the wireless communication apparatus and the second wireless communication apparatus can be achieved.

According to the second embodiment, the user is able to easily identify a portable information terminal, and a login operation to the image processing apparatus 100 and the portable information terminal can be achieved without a key operation by the user. That is, a plurality of portable information terminals that performs wireless communication can be easily identified with minimal burden on the user, and logging into the information processing apparatus can be rapidly completed.

Third Embodiment

A configuration of a data processing program that can be read by an information processing system according to a third embodiment will be described with reference to a memory map of a storage medium, such as a floppy disk (FD) or compact disc read-only memory (CD-ROM), shown in FIG. 9.

Figure 9:
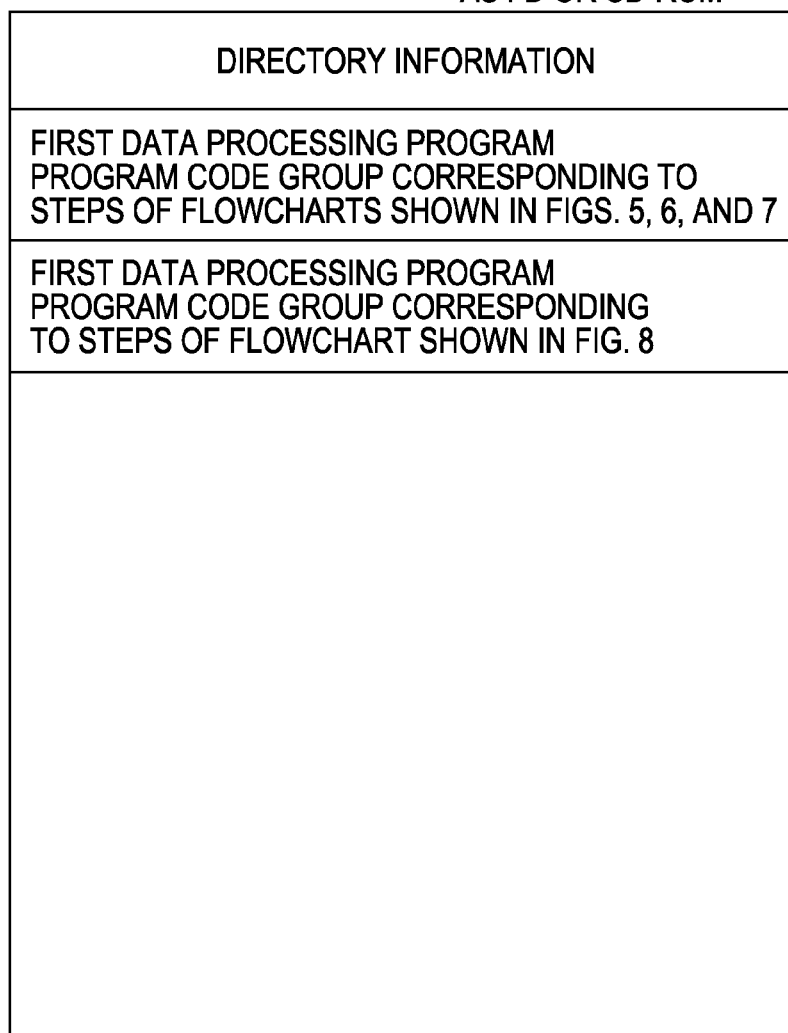
FIG. 9 is an illustration for explaining a memory map of a storage medium in which various data processing programs that can be read by an information processing system according to an embodiment of the present invention are stored.

FIG. 9 is an illustration for explaining the memory map of the storage medium in which various data processing programs that can be read by the information processing system according to the third embodiment are stored. Although the flowcharts shown in FIGS. 5 to 8 show a procedure of the entire system for the sake of explanation, the flowcharts shown in FIGS. 5 to 8 may be configured as a data processing program for each device.

That is, in FIGS. 5 to 8, each of the processing of the first wireless communication apparatus, the processing of the second wireless communication apparatus, and the processing of the information processing apparatus may be configured as an individual data processing program.

Although not particularly illustrated, in addition to information managing a program group stored in the storage medium, such as version information and a creator, information that depends on an operating system (OS) on a program reading side or the like, such as an icon that identifies the program, may be stored.

Furthermore, data depending on various programs is managed by the above-mentioned directory. In addition, a program for installing the various programs into a computer, a decompressing program for decompressing a compressed program to be installed, and the like may be stored.

The functions shown in FIGS. 5 to 8 in the foregoing embodiments may be executed by a host computer in accordance with an externally installed program. In this case, the present invention is also applicable to a case where an information group including the program is supplied from a storage medium, such as a CD-ROM, a flash memory, or a floppy disk, or from an external storage medium via a network, to an output device.

As described above, a storage medium on which program code of software for realizing the functions of the foregoing embodiments is recorded is supplied to a system or an apparatus. Aspects of the present invention may be achieved by reading and executing the program code stored in the storage medium by a computer (or a CPU or a microprocessing unit (MPU)) of the system or the apparatus.

In this case, the program code itself read from the storage medium attains new functions of the foregoing embodiments, and the storage medium storing the program code constitutes the present invention.

Thus, any type of program, such as object code, a program to be executed by an interpreter, or script data to be supplied to the OS, may be used as long as it includes a function of a program.

The storage medium for supplying a program may be, for example, a floppy disk, a hard disk, an optical disc, a magneto-optical disc, an MO, a CD-ROM, a compact disc-recordable (CD-R), a compact disc (CD)-rewritable (CD-RW), a magnetic tape, a nonvolatile memory card, a ROM, a digital versatile disc (DVD), or the like.

In this case, the program code itself read from the storage medium attains the above-described functions of the foregoing embodiments, and the storage medium storing the program code constitutes the present invention.

In addition, the program may be supplied by connecting to a homepage on the Internet using a browser of a client computer and by downloading a computer program according to an aspect of the present invention or a compressed file having an automatic installation function from the homepage to a storage medium, such as a hard disk. In addition, the program may be supplied by dividing the program code constituting the program according to an aspect of the present invention into a plurality of files and by downloading the divided files from different homepages. That is, a World Wide Web (WWW) server, a file transfer protocol (FTP) server, and the like for allowing a plurality of users to download a program file for realizing function processing of an aspect of the present invention on a computer are also included in the present invention.

A program according to an aspect of the present invention may be encoded and stored in a storage medium, such as a CD-ROM, and may be distributed to users. Only a user who satisfies predetermined conditions may be able to download key information for decoding the encoded program from a homepage via the Internet. In addition, the encoded program can be executed by using the downloaded key information and can be installed to a computer.

In addition, the functions of the foregoing embodiments can be attained not only by executing the read program code by the computer but also by performing part or all of the actual processing by an OS or the like running on the computer on the basis of instructions of the program code.

Furthermore, the program code read from the storage medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

The present invention is not limited to the foregoing embodiments. Various changes including organic combinations of the foregoing embodiments may be made within the spirit and scope of the present invention. Such various modifications may also fall within the scope of the present invention.

Various examples and embodiments of the present invention have been explained. It should be understood by those skilled in the art that the spirit and scope of the present invention are not limited to a specific description of this specification.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method executed by a first device which communicates with a second device, the method comprising:
receiving first information from the second device via short-range wireless communication;
transmitting, based on the receipt of the first information via the short-range wireless communication, second information to the second device via wireless local-area network (LAN) communication; and
receiving, from the second device and based on the transmission of the second information, scanned data generated by a scan performed in the second device via the wireless local-area network (LAN) communication.

2. The method according to claim 1, wherein the first information includes identification information of the second device.

3. The method according to claim 1, further comprising identifying the second device based on the first information,
wherein the scanned data is received from the second device which has been identified based on the first information.

4. The method according to claim 1, wherein the second information includes identification information of the first device.

5. The method according to claim 1, further comprising transmitting, based on the receipt of the first information via the short-range wireless communication, data for causing the second device to perform printing to the second device.

6. The method according to claim 1, wherein the short-range wireless communication is communication using a contactless IC chip.

7. The method according to claim 1, wherein the short-range wireless communication is communication using Radio Frequency Identification (RFID).

8. The method according to claim 1, further comprising establishing, based on the receipt of the first information via the short-range wireless communication, communication between the first device and the second device.

9. The method according to claim 8, wherein the scanned data is received via the communication which is established based on the receipt of the first information via the short-range wireless communication.

10. The method according to claim 1, further comprising performing communication between the first device and the second device via Bluetooth.

11. The method according to claim 1, wherein the second device has a printer unit which is comprised of an inkjet printer.

12. The method according to claim 1, wherein the second device has a printer unit which is comprised of a laser beam printer.

13. The method according to claim 1, wherein the second device performs the short-range wireless communication by using a communication unit which is a reader/writer.

14. A first device to communicate with a second device, the first device comprising:

a first reception unit configured to receive first information from the second device via short-range wireless communication;

a transmission unit configured to transmit, based on the receipt of the first information via the short-range wireless communication, second information to the second device via wireless local-area network (LAN) communication; and a second reception unit configured to receive, from the second device and based on the transmission of the second information, scanned data generated by a scan performed in the second device via the wireless local-area network (LAN) communication.

15. A non-transitory computer-readable storage medium storing a program to cause a computer to perform a method executed by a first device which communicates with a second device, the method comprising:

receiving first information from the second device via short-range wireless communication;

transmitting, based on the receipt of the first information via the short-range wireless communication, second information to the second device via wireless local-area network (LAN) communication; and receiving, from the second device and based on the transmission of the second information, scanned data generated by a scan performed in the second device via the wireless local-area network (LAN) communication.

* * * * *